(12) United States Patent
Pelin et al.

(10) Patent No.: US 9,340,422 B2
(45) Date of Patent: May 17, 2016

(54) PROCESS FOR THE PRODUCTION OF CHLORINE DIOXIDE

(75) Inventors: Kalle Hans Thomas Pelin, Ytterby (SE); Nils Torgny Björkman, Onsala (SE)

(73) Assignee: AKZO NOBEL N.V., Arnhem (NL)

( * ) Notice: Subject to any disclaimer, the term of this patent is extended or adjusted under 35 U.S.C. 154(b) by 0 days.

(21) Appl. No.: 13/377,309

(22) PCT Filed: Jun. 11, 2010

(86) PCT No.: PCT/EP2010/058217
§ 371 (c)(1),
(2), (4) Date: Mar. 12, 2012

(87) PCT Pub. No.: WO2010/145996
PCT Pub. Date: Dec. 23, 2010

(65) Prior Publication Data
US 2012/0156125 A1    Jun. 21, 2012

Related U.S. Application Data

(60) Provisional application No. 61/187,417, filed on Jun. 16, 2009.

(30) Foreign Application Priority Data

Jun. 16, 2009    (EP) ..................................... 09162871

(51) Int. Cl.
*C01B 11/02* (2006.01)
(52) U.S. Cl.
CPC ............. *C01B 11/023* (2013.01); *C01B 11/025* (2013.01); *C01B 11/026* (2013.01); *C01B 11/028* (2013.01)

(58) Field of Classification Search
USPC .................................................. 423/477, 478
See application file for complete search history.

(56) References Cited

U.S. PATENT DOCUMENTS

| | | |
|---|---|---|
| 2,108,976 A | 8/1934 | Vincent |
| 3,023,076 A | 2/1962 | Karwat |

(Continued)

FOREIGN PATENT DOCUMENTS

| | | |
|---|---|---|
| CN | 1114632 A | 1/1996 |
| CN | 1415534 | 5/2003 |

(Continued)

OTHER PUBLICATIONS

International Search Report for PCT/EP2010/058217, dated Oct. 19, 2012, 5 pages.

(Continued)

*Primary Examiner* — Ngoc-Yen Nguyen
(74) *Attorney, Agent, or Firm* — Kenyon & Kenyon LLP

(57) ABSTRACT

Process for the continuous production of chlorine dioxide comprising generating chlorine dioxide in an aqueous reaction medium in a reaction vessel (1) maintained at sub-atmospheric pressure, bringing gaseous chlorine dioxide from said reaction vessel to an absorption tower (7) and contacting it therein with a flow of water to form an aqueous solution containing chlorine dioxide, bringing said aqueous solution containing chlorine dioxide to a stripper (12), blowing a gas through said aqueous solution of chlorine dioxide in the stripper to strip off from 10 to 100% of the chlorine dioxide entering the stripper and form a gaseous chlorine dioxide product.

18 Claims, 1 Drawing Sheet

(56) References Cited

U.S. PATENT DOCUMENTS

| | | | |
|---|---|---|---|
| 4,086,329 A | | 4/1978 | Cowley et al. |
| 4,123,484 A | * | 10/1978 | Schnez ............... 264/0.5 |
| 4,129,484 A | | 12/1978 | Larsson |
| 4,372,939 A | * | 2/1983 | Bielz et al. ............ 423/478 |
| 4,501,824 A | * | 2/1985 | Hardee et al. .......... 502/339 |
| 5,091,166 A | * | 2/1992 | Engstrom et al. ....... 423/478 |
| 5,091,167 A | | 2/1992 | Engstrom |
| 5,324,497 A | | 6/1994 | Westerlund |
| 5,366,714 A | | 11/1994 | Bigauskas |
| 5,478,446 A | | 12/1995 | Falgen et al. |
| 5,487,881 A | | 1/1996 | Falgen et al. |
| 5,674,466 A | | 10/1997 | Dahl et al. |
| 5,770,171 A | | 6/1998 | Sundblad |
| 5,858,322 A | | 1/1999 | Gray |
| 6,051,135 A | * | 4/2000 | Lee et al. ............ 210/192 |
| 6,322,690 B1 | | 11/2001 | Hammer-Olsen et al. |
| 6,555,085 B2 | * | 4/2003 | Bechberger ........ C01B 11/022 252/187.21 |
| 6,569,285 B2 | | 5/2003 | Bryant et al. |
| 6,585,950 B1 | | 7/2003 | Dahl et al. |
| 6,752,904 B2 | | 6/2004 | Bryant et al. |
| 7,118,720 B1 | | 10/2006 | Mendelsohn et al. |
| 2003/0031621 A1 | * | 2/2003 | Gravitt et al. ........ 423/477 |

FOREIGN PATENT DOCUMENTS

| | | |
|---|---|---|
| EP | 0612686 | 8/1994 |
| JP | 63-008203 | 1/1988 |
| JP | 03-115102 | 5/1991 |
| WO | 2006/033609 | 3/2006 |
| WO | 2006/062455 | 6/2006 |
| WO | 2007/058936 | 5/2007 |
| WO | 2009/010456 | 1/2009 |
| WO | WO2009/010456 | 1/2009 |

OTHER PUBLICATIONS

Barr, Andrew, et al., "The development of an integrated chlorine dioxide process to produce chlorine dioxide solution with low chlorine content", Appita J., 2006, vol. 59, No. 6, pp. 442-445.

Dence, Carlton W., et al., "Pulp Bleaching: Principles and Practice", Tappi Press 1996, Section II: Raw Materials, Chapter 2: Bleaching Chemicals: Chlorine Dioxide, pp. 61-69.

Barr A. et al., The Development of an Integrated Chlorine Dioxide Process to Produce Chlorine Dioxide Solution With Low Chlorine Content; Appita Journal, AU, Appita Inc., Jan. 1, 2006, vol. 59, No. 6, pp. 442-445.

Office Action received in Japanese Patent Application No. 2012-515443 mailed on Oct. 22, 2013.

Office Action received in Chinese Patent Application No. 20100800244275 mailed on Mar. 5, 2014.

\* cited by examiner

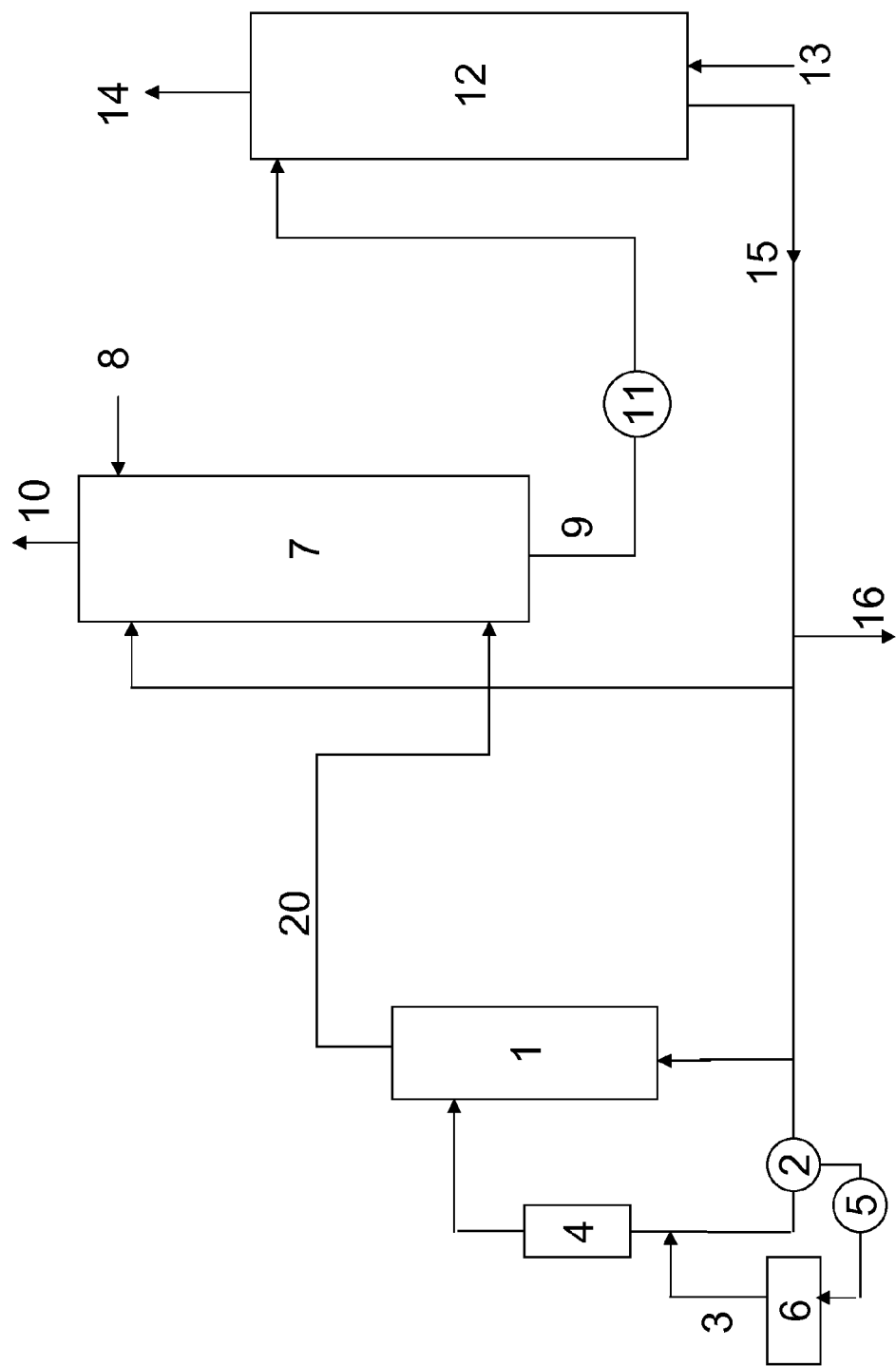

PROCESS FOR THE PRODUCTION OF CHLORINE DIOXIDE

REFERENCE TO RELATED APPLICATIONS

This application is the U.S. National Phase of PCT/EP2010/058217 filed on Jun. 11, 2010, and claims the benefit of U.S. Provisional Application No. 61/187,417, filed on Jun. 16, 2009.

The present invention relates to a process for the production of chlorine dioxide enabling generation of gaseous chlorine dioxide at selected pressure.

There are numerous different processes for chlorine dioxide production. Most large scale processes in commercial use are run at pulp mills and involve continuous reaction of alkali metal chlorate in an acidic reaction medium with a reducing agent such as hydrogen peroxide, methanol, chloride ions or sulfur dioxide to form chlorine dioxide that is withdrawn as a gas from the reaction medium and then absorbed in water. An overview of such processes can be found in "Pulp Bleaching—Principles and Practice", TAPPI PRESS 1996, Section II: Raw Materials, Chapter 2: Bleaching Chemicals: Chlorine Dioxide, p. 61-69.

As an example, in one series of processes the reaction medium is maintained under non-crystallising conditions, generally at substantially atmospheric pressure. In most cases depleted reaction medium from a first reaction vessel is brought to a second reaction vessel for further reactions to produce chlorine dioxide. Depleted reaction medium withdrawn from the final reaction vessel, usually referred to as residual acid, contains acid, alkali metal salt of the acid and normally some unreacted alkali metal chlorate. Examples of non-crystallising chlorine dioxide generation processes are described in EP 612686, WO 2006/033609, JP 03-115102 and JP 88-008203.

In another series of processes the reaction medium is maintained in a single reaction vessel under boiling conditions at subatmospheric pressure, wherein alkali metal salt of the acid is precipitated and withdrawn as a salt cake. Examples of such processes are described in U.S. Pat. Nos. 5,091,166, 5,091,167, 5,366,714 and 5,770,171, and in WO 2006/062455. Such processes are usually the most efficient ones for large scale production of chlorine dioxide, and are generally referred to as single vessel processes (SVP). Usually methanol or hydrogen peroxide is used as reducing agent, which avoids formation of significant amounts of chlorine as a by-product.

When producing chlorine dioxide from alkali metal chlorate with chloride as a reducing agent, high amounts of chlorine is obtained as a by-product. It has then been disclosed in e.g. U.S. Pat. Nos. 4,086,329, 5,324,497 and 2,108,976 to purify the chlorine dioxide from chlorine by various unit operations, including absorption and stripping.

Chlorine dioxide is normally used as an aqueous solution obtained in the production process, particularly in pulp bleaching. It has also been disclosed to use chlorine dioxide in gas phase, for example for removing lignin from wood chips as described in U.S. Pat. Nos. 6,569,285 and 6,752,904, or for treatment of flue gas as described in e.g. U.S. Pat. No. 3,023,076.

WO 2009/010456 discloses a process for producing gaseous chlorine dioxide in a reaction vessel maintained at super-atmospheric pressure by bringing withdrawn gaseous chlorine dioxide to an aqueous absorption medium and withdrawing gaseous chlorine dioxide from the absorption medium.

It would be advantageous to be able to provide a process run at sub-atmospheric pressure that is attractive for producing chlorine dioxide to be used in gas phase at selected pressure. Due to stability problems it is difficult to store gaseous chlorine dioxide and those processes in which chlorine dioxide is withdrawn from the reaction medium as a gas are difficult to control sufficiently rapidly to meet variations in the demand, whereby a liquid storage tank is necessary. It would also be advantageous to be able to provide a process to produce gaseous chlorine dioxide at sub-atmospheric pressure having low concentrations of by-products such as chloride, chlorate and sulfate ions.

It is an object of the present invention to provide an efficient process for the production at subatmospheric pressure of chlorine dioxide that is suitable for applications in which gaseous chlorine dioxide is used.

According to the present invention there is provided a very efficient process for producing chlorine dioxide run at sub-atmospheric pressure and it has surprisingly been found that the process may be used to produce gaseous chlorine dioxide of high purity and obtained at a desired pressure, which is otherwise very difficult to achieve. Accordingly, the present invention concerns a process for the continuous production of chlorine dioxide comprising generating chlorine dioxide in an aqueous reaction medium in a reaction vessel maintained at sub-atmospheric pressure, bringing gaseous chlorine dioxide from said reaction vessel to an absorption tower and contacting it therein with a flow of water to form an aqueous solution containing chlorine dioxide, bringing said aqueous solution containing chlorine dioxide to a stripper, blowing a gas through said aqueous solution of chlorine dioxide in the stripper to strip off from 10 to 100% of the chlorine dioxide entering the stripper and form a gaseous chlorine dioxide product.

The chlorine dioxide may, for example, be generated as described in the earlier mentioned U.S. Pat. Nos. 5,091,166, 5,091,167, 5,366,714 and 5,770,171, and WO 2006/062455.

The chlorine dioxide is preferably generated by reducing chlorate ions by means of a chemical reducing agent. Any known reducing agent may be used alone or in mixtures, such as at least one of chloride ions, sulfur dioxide, methanol and hydrogen peroxide, of which methanol and hydrogen peroxide, alone or in mixture with one or more other reducing agents, are particularly preferred.

The pressure and the temperature are preferably set so to evaporate water from the reaction medium to dilute the chlorine dioxide formed and withdrawn from the reaction medium and brought from the reaction vessel. Preferably the reaction medium is maintained at a temperature from about 15 to about 100° C., most preferably from about 30 to about 85° C. Suitably the reaction medium is maintained at an absolute pressure from about 8 to about 80 kPa, preferably from about 8 to about 55 kPa, most preferably from about 10 to about 50 kPa. Preferably the reaction medium is maintained at its boiling point at the prevailing pressure.

As the evaporation of water from the reaction medium normally consumes more energy than generated in the process, this is preferably balanced by supplying heat to the reaction medium, for example by circulating reaction medium through a heater in a circulation conduit. Any kind of heater may be used, such as heat exchangers heated by steam or any other hot fluid medium.

Any alkali metal chlorate may be used, such as chlorate of sodium, potassium or mixtures thereof. Normally sodium is preferred. It is also possible to feed the alkali metal chlorate as a pre-mixed solution with the hydrogen peroxide. The concentration of alkali metal chlorate maintained in the reaction medium may vary within wide limits, for example from about 0.25 moles/dm³ up to saturation, preferably from about 1.5 moles/dm³ up to saturation, most preferably from about 2.5 moles/dm³ up to saturation.

The aqueous reaction medium in the reaction vessel is preferably acidic, for example having an acidity from about 0.5 to about 12 N or from about 1 to about 10 N, most preferably from about 1.5 to about 7 N. The acidity may be provided by feeding any suitable acid, preferably a mineral acid. Examples of acids include sulfuric acid, hydrochloric acid, phosphoric acid and chloric acid, of which sulfuric acid is particularly preferred.

If sulfuric acid is used, it is preferably fed at a concentration from about 30 to about 98 wt %, most preferably from about 60 to about 85 wt %. Sulfuric acid of low concentration is easier to mix with the reaction medium, but a high concentration gives the advantage of utilisation of the heat of dilution and not needing to evaporate a lot of water. The amount fed is preferably balanced to the amount of chlorate fed in order to arrive at a steady state concentration in the generator suitable for the reducing agent chosen.

If hydrogen peroxide is used as reducing agent, it is preferably fed in an amount from about 0.5 to about 2 moles per mole alkali metal chlorate fed, most preferably from about 0.5 to about 1 mole per mole alkali metal chlorate fed, particularly most preferably from about 0.5 to about 0.6 moles per mole alkali metal chlorate fed.

If methanol is used as reducing agent, it is preferably fed in an amount from about 0.2 to about 1 moles per mole alkali metal chlorate fed, most preferably from about 0.2 to about 0.8 mole per mole alkali metal chlorate fed, particularly most preferably from about 0.2 to about 0.4 moles per mole alkali metal chlorate fed.

It is preferred to operate the process under conditions to obtain precipitation of solid alkali metal sulfate in the reaction medium. Depending on the acidity of the reaction medium, substantially neutral sulfate or acidic sesquisulfate may form. However, it is also possible to operate the process under such conditions that no formation of solid alkali metal sulfate occurs.

At least some of the alkali metal sulfate formed is normally withdrawn, preferably as a solid salt cake which may be removed on a conventional filter, and may in some cases be used as a by-product. However, it is also possible to electro-chemically acidify some of the alkali metal sulfate and recycle it to the reaction medium to replace some of the sulfuric acid feed. Such electrochemical acidification is described in e.g. U.S. Pat. Nos. 4,129,484, 5,478,446, 5,487,881, 5,858,322 and 632,269.

Gaseous chlorine dioxide gas is withdrawn from the reaction medium, preferably together with evaporated water and optionally other gaseous components formed or added, such as oxygen in case hydrogen peroxide is used as reducing agent. The concentration of chlorine dioxide in the withdrawn gas is preferably maintained at a partial pressure from about 1 to about 30 kPa or from about 5 to about 10 kPa. The total pressure is also made up from the amount of water vapor and soluble and insoluble gases.

High system utilisation may, depending on the reaction vessel design, result in a co-transportation of reaction medium as aerosols, thereby bringing electrolytic components to the absorption tower together with the chlorine dioxide. Such component, for example sodium chlorate or sodium sulfate, may in the present invention be separated from the final gaseous chlorine dioxide product.

The gaseous chlorine dioxide withdrawn from the reaction medium is brought to an absorption tower where it is contacted with a flow of water to form an aqueous solution containing chlorine dioxide. By the term "absorption tower", as used herein, is meant any column or tower or the like where gas is contacted with a liquid flow to absorb water soluble compounds therein. Gas and liquid preferably flow countercurrently. Inside the absorption tower devices such as plates or packing elements are preferably placed to provide interfacial surfaces where the mass transfer between the gas and the liquid can take place. Any conventional packing elements and plates can be used such as Raschig rings, Berl saddles, Intalox saddles, sieve plates and bubble cap plates.

In an embodiment, the absorption tower is specially adapted for processes using chloride ions as reducing agents. Such an absorption tower is described in Barr, A. et al., *The development of an integrated chlorine dioxide process to produce chlorine dioxide solution with low chlorine content*, Appita J., Vol 59, No. 6, (2006).

The chlorine dioxide concentration in the aqueous solution obtained from the absorption tower is preferably from about 5 to about 18 g/dm³, or from about 8 to about 12 g/dm³. The temperature is preferably from about 0 to about 35° C., or from about 5 to about 25° C.

The pH of the aqueous solution obtained from the absorption tower can vary within a wide range, partly dependent on the chlorine dioxide concentration, such as from about 0.8 to about 3.2. If methanol is used as reducing agent, the pH is preferably from about 1.0 to about 2.5, while if hydrogen peroxide is used as reducing agent, the pH is preferably from about 2.0 to about 3.2.

In an embodiment of the invention, the aqueous solution in the absorption tower is acidified to suppress the absorption of elemental chlorine and possibly present formic acid by decreasing the chlorine hydrolysis and depressing the deprotonation of formic acid. Elemental chlorine and formic acid are then brought with the off gas from the absorption tower and are thus separated from the chlorine dioxide. The pH in the chlorine dioxide solution is preferably kept as low as possible or at least below pH 2 and most preferably below pH 1.4. Adjustment of pH can be made by any acid, but preferably sulfuric or hydrochloric acid is used.

In an embodiment of the invention, the pH of the aqueous chlorine dioxide solution leaving the absorption tower is increased to from about 6.5 to about 7.8, which decreases the release of volatile by-products from the chlorine dioxide generation process during the following stripping. Adjustment of the pH can be made by any alkali source, but preferably sodium hydroxide is used.

A very high yield of chlorine dioxide with respect to the amount of added chlorate ions may be obtained in the gas stream leaving the stripper. Such a yield may be from 96%, preferably from 98%, most preferably from 99% with respect to the amount of added chlorate ions.

By the above arrangement, it has been found possible to produce chlorine dioxide without employing a liquid storage tank. Such a storage tank is not only an expensive investment, it also takes up a large space, requires extensive safety measures to be taken and chlorine dioxide may be lost due to reactions therein.

Non-absorbed gas departed from the absorption tower, containing for example inert gas, oxygen and water vapor and small amounts of chlorine dioxide, may be used for various purposes like flue gas treatment as described in e.g. U.S. Pat. Nos. 3,023,076 and 7,118,720, and in WO 2007/058936. The chlorine dioxide may otherwise be scrubbed off in a scrubber.

The aqueous solution containing chlorine dioxide is brought from the absorption tower to a stripper, wherein from 10 to 100% of the chlorine dioxide is stripped off by blowing a gas through the aqueous chlorine dioxide solution to form a gaseous chlorine dioxide product. By the term "gaseous chlorine dioxide product", as used herein, is meant the gas leaving the stripper. Apart from chlorine dioxide the gaseous chlorine dioxide product may comprise any non-absorbed part of the gas blown through the aqueous solution in the stripper. Any type of stripper, or stripper column, may be used, for example filler columns and packed columns. Any conventional packing elements may be used, such as structured packing, Raschig rings, Berl saddles, Intalox saddles etc.

The gas used for stripping is preferably an inert gas. Any available inert gas such as nitrogen or oxygen can be used, but for cost reasons it is usually preferred to use air. If the application allows, it may be possible to recover the inert gas and reuse it in the stripper.

In an embodiment, part, or all, of the aqueous solution from the stripper may be recirculated to the absorption tower, in order to recover any remaining chlorine dioxide. The recirculation rate of depleted aqueous solution may be from about 0% to about 100%, preferably from about 70% to about 90%. The recirculation rate determines the desired desorption efficiency of the stripper. Preferably from 40 to 95% or from 85% to 95%, of the chlorine dioxide entering the stripper may be stripped off.

It is also possible to recirculate the aqueous solution from the stripper to the reaction vessel to convert any remaining chlorate or any other reactants to chlorine dioxide. Such part of the aqueous solution may be from about 10 to about 80%, preferably from about 10 to about 30%.

In an embodiment of the invention, the aqueous chlorine dioxide solution from the absorption tower may be heated in order to enhance the desorption in the stripper. In a further embodiment, the depleted aqueous solution from the stripper may be cooled before it is recirculated to the absorption tower. This may be done by use of any heating or cooling media available or by use of a heat pump.

In an embodiment, the gaseous chlorine dioxide product from the stripper is maintained at a total absolute pressure from about 10 kPa to about 2 MPa, such as from about 95 kPa to about 2 MPa or 105 kPa to 1 MPa.

The gaseous chlorine dioxide product obtained from the stripper may have a partial pressure of chlorine dioxide from about 0.5 kPa to 20 kPa, or from about 4 kPa to about 12 kPa. If the partial pressure of chlorine dioxide is too high the risk for rapid decomposition of chlorine dioxide is imminent.

A desired pressure may be achieved by maintaining the bottom of the absorption tower at a height relative a pump bringing the aqueous chlorine dioxide to the stripper, thus forming a stand pipe. By this arrangement, it is possible to control the pressure of the formed gaseous chlorine dioxide in the stripper. When gaseous chlorine dioxide is used e.g. for flue gas treatment, the chlorine dioxide is preferably contained in a gas having a pressure above atmospheric in order to be able to be led to the flue gas. Thus, the pressure can be increased by increasing the selected height between the pump and the bottom of the absorption tower. Such a height may be from 5 m, or 10, or 15 m up to 50 m, depending on the pressure desired. However, if no such pressure control is applied, it is also possible to maintain the pressure below atmospheric, if this is preferred in the process. A stand pipe may similarly be formed by selecting the height of the bottom of the reaction vessel in relation to the pump. The desired pressure may also be achieved by using a pressure control valve after the stripper, allowing a pump to increase the pressure of the gaseous chlorine dioxide. Such a pressure control valve is needed both on the gas outlet and the residual solution. Hence, the stripper may be situated on the ground floor.

In an embodiment the process is operated so the gaseous chlorine dioxide product has a content of elemental chlorine less than about 1 wt %, more preferably less than 0.2 wt % of the total active chlorine.

In an embodiment the process is operated so the gaseous chlorine dioxide product may be essentially free from electrolytic impurities as chlorate and sulfate when leaving the stripper, or may have a content of chlorate and sulfate less than 0.1 mg sodium chlorate or sodium sulfate per normal cubic meter dry gas, respectively In an embodiment the process is operated so the gaseous chlorine dioxide product leaving the stripper has a content of formic acid less than about 100 mg formic acid per normal cubic meter dry gas, or more preferably less than 1 mg formic acid per normal cubic meter dry gas.

Due to the absorbing, gases not soluble in water are not obtained in the aqueous solution containing chlorine dioxide. The stripping further increases the purity of the gaseous chlorine dioxide product. As a result, the gaseous chlorine dioxide product has a high purity in respect of raw materials and unwanted by-products which can be carried out together with the gas stream from the reaction vessel.

In an embodiment of the invention, an aqueous chlorine dioxide product is obtained by bringing the gaseous chlorine dioxide product to another absorption tower to form an aqueous chlorine dioxide product of the above mentioned high purity. Conditions for the absorption tower may be as described above.

In case of interruption of the chlorine dioxide generation, the demand for gaseous chlorine dioxide may still be satisfied for some time by blowing inert gas through the aqueous chlorine dioxide solution and thereby stripping off chlorine dioxide.

An embodiment of the invention will now be described in connection with the appended FIGURE showing a schematic flow diagram thereof. The invention is, however, not limited to the embodiment shown.

Referring to the FIGURE, an SVP® process for the production of a gaseous chlorine dioxide product according to the invention is schematically shown. A reaction vessel 1 holds a reaction medium under subatmospheric pressure. The reaction medium is circulated by a pump 2 through a circulation conduit 3 and a heater 4 (commonly called "reboiler") and back to the reaction vessel 1 at a rate sufficient for keeping the temperature of the reaction medium at the boiling point. A sodium chlorate, sulfuric acid and a reducing agent such as methanol or hydrogen peroxide, are fed to the reaction vessel and reacted to form chlorine dioxide, sodium sulfate and, in case hydrogen peroxide is used, oxygen. Chlorine dioxide is withdrawn as a gas 20 together with evaporated water and optionally oxygen and is brought to an absorption tower 7. Sodium sulfate precipitates as a substantially neutral or acidic salt, depending on the acidity of the reaction medium. By a pump 5, reaction medium is circulated through a filter 6 to separate and withdraw the solid sodium sulfate.

In the absorption tower 7 the gaseous chlorine dioxide is contacted with a flow of water 8 to form an aqueous solution containing chlorine dioxide 9. Any non absorbed gas 10 will exit at the top of the absorption tower 7. The aqueous chlorine dioxide departs from the absorption tower 7 and is led by a pump 11 to a stripper 12. A gas 13, preferably an inert gas, usually air, is supplied to the bottom of the stripper 12 to strip off at least 10% chlorine dioxide entering the stripper 12 as a gaseous chlorine dioxide product 14 departing from the top of the stripper 12. an aqueous solution 15, in which part of the chlorine dioxide may remain, is withdrawn from the bottom of the stripper 12 and may fully or partially be recirculated to the absorption tower 7 or the reaction vessel 1. A stream purge 16 might be appropriate in order to maintain the water balance, depending on parameters such as the choice of chemistry, the outlet gas pressure and temperature, the choice of operating conditions in the chlorine dioxide generation and the operating conditions in the stripper. Depending on the operating conditions in the stripper, this stream 16 may contain various amounts of chlorine dioxide and should be treated accordingly. There might also be a demand for an aqueous chlorine dioxide solution for other purposes at the same site. It is then possible to use aqueous chlorine dioxide from the absorber 7, for example by taking out a side stream (not shown) departing from stream 9.

If there is an interruption in the generation of chlorine dioxide in the reaction vessel, the gas flow through the stripper may be continued to strip off chlorine dioxide from the stripper.

As an example of operating conditions when producing chlorine dioxide from sodium chlorate, sulfuric acid and hydrogen peroxide at a pressure of 25 kPa, the aqueous reaction medium in the reaction vessel 1 may contain about 150 g/dm$^3$ NaClO$_3$ and about 340 g/dm$^3$ H$_2$SO$_4$, while the gas leaving the reaction vessel may contain about 15-60% v/v of ClO$_2$. The aqueous solution containing chlorine dioxide obtained in the absorption tower 7 may then have a temperature of about 10° C. and contain about 10 g/dm$^3$ ClO$_2$.

The partial pressure of the gaseous chlorine dioxide product obtained from the stripper 10 may be about 6 kPa and the total pressure of the gas stream leaving the stripper may be 105 kPa absolute.

EXAMPLE

Chlorine dioxide was produced by reduction of chlorate in an SVP® process reactor operated at 25.5 kPa and 75° C. Gas comprising chlorine dioxide was led from the reactor to an absorption tower, where it was contacted with a flow of water to form an aqueous solution containing chlorine dioxide. The aqueous solution containing chlorine dioxide obtained had a temperature of about 12° C. and contained about 8-9 g/dm$^3$ ClO$_2$. The aqueous solution was then led to a stripper, where gaseous chlorine dioxide was stripped off, having a partial pressure of about 6 kPa and a total absolute pressure of 25 kPa. A set of experiment was carried out using a pilot scale stripper column, 4.5 m height, with random packing in two 1.5 m beds. In the referred experiments, chlorine dioxide solution containing 8-9 g/dm$^3$ ClO$_2$ was fed to the top of the column which was operated in single-pass mode. At the same time air was sucked through the column to facilitate the stripping. Samples were withdrawn from the liquid before and after passing the column and analyzed for ClO$_2$ content. Process data and analytical results are given in Table 1 below. As can be clearly seen from the results, gaseous chlorine dioxide was stripped off in the stripper column. Depending on the parameters selected at stripping, more or less gaseous chlorine dioxide may be stripped off.

TABLE 1

| Exp. | Temperature ° C. | Pressure kPa | Liquid flow m$^3$/h | Air flow Nm$^3$/h | Air/liq. Flow Nm$^3$/m$^3$ | ClO$_2$ conc. in g/dm$^3$ | ClO$_2$ conc. out g/dm$^3$ |
|---|---|---|---|---|---|---|---|
| 1 | 12 | 25 | 2 | 3 | 1.5 | 8.50 | 5.87 |
| 2 |    |    | 3 | 3 | 1    | 8.71 | 6.49 |
| 3 |    |    | 3 | 3 | 1    | 8.60 | 6.72 |
| 4 |    |    | 3 | 4 | 1.33 | 8.56 | 6.21 |

The invention claimed is:

1. A process for the continuous production of chlorine dioxide comprising
   generating chlorine dioxide in an acidic aqueous reaction medium in a reaction vessel maintained at sub-atmospheric pressure,
   bringing gaseous chlorine dioxide from said reaction vessel to an absorption tower and contacting it therein with a flow of water to form an aqueous solution containing chlorine dioxide,
   bringing said aqueous solution containing chlorine dioxide from the absorption tower to a stripper, and increasing the pH of the aqueous solution containing chlorine dioxide leaving the absorption tower to is from about 6.5 to about 7.8,
   blowing a gas through said aqueous solution of chlorine dioxide in the stripper to strip off from 10 to 100% of the chlorine dioxide entering the stripper and form a gaseous chlorine dioxide product obtained from the stripper with a partial pressure of from 0.5 to 20 kPa.

2. The process as claimed in claim 1, wherein the chlorine dioxide is generated by reducing chlorate ions by means of a chemical reducing agent.

3. The process as claimed in claim 2, wherein said chemical reducing agent is at least one of methanol or hydrogen peroxide.

4. The process as claimed in claim 1, wherein from 40 to 95% of the chlorine dioxide entering the stripper is stripped off.

5. The process as claimed in claim 1, wherein from 85 to 95% of the chlorine dioxide entering the stripper is stripped off.

6. The process as claimed in claim 1, wherein said reaction medium is maintained at an absolute pressure from about 8 to about 80 kPa.

7. The process as claimed in claim 1, wherein said reaction medium is maintained at its boiling point at the prevailing pressure.

8. The process as claimed in claim 1, wherein the temperature of the aqueous solution containing chlorine dioxide is from about 0 to about 35° C.

9. The process as claimed in claim 1, wherein a total yield of chlorine dioxide leaving the stripper is about 96% or more with respect to added chlorate ions.

10. The process as claimed in claim 1, wherein said gaseous chlorine dioxide product is maintained at an total absolute pressure from about 10 kPa to about 2 MPa.

11. The process as claimed in claim 1, wherein said gaseous chlorine dioxide product is maintained at a total absolute pressure from about 105 kPa to about 1 MPa.

12. The process as claimed in claim 1, wherein the aqueous solution from the stripper containing remaining chlorine dioxide is at least partly recirculated to said absorption tower, or to said reaction vessel.

13. The process as claimed in claim 1, wherein the gas blown through the aqueous solution of chlorine dioxide in the stripper is an inert gas.

14. The process as claimed in claim 13, wherein said inert gas is air.

15. The process as claimed in claim 3, wherein the chemical reducing agent is hydrogen peroxide which is fed to the aqueous reaction medium in an amount from about 0.5 to about 2 moles per mole of fed alkali metal chlorate.

16. The process as claimed in claim 3, wherein the chemical reducing agent is methanol which is fed to the aqueous reaction medium in an amount from about 0.2 to about 1 moles per mole of fed alkali metal chlorate.

17. The process as claimed in claim 1, wherein the aqueous solution in the absorption tower is acidified.

18. A process for the continuous production of chlorine dioxide comprising generating chlorine dioxide in an acidic aqueous reaction medium in a reaction vessel maintained at sub-atmospheric pressure, bringing gaseous chlorine dioxide from said reaction vessel to an absorption tower and contacting it therein with a flow of water to form an aqueous solution containing chlorine dioxide, bringing said aqueous solution containing chlorine dioxide from the absorption tower to a stripper, and increasing the pH of the aqueous solution containing chlorine dioxide leaving the absorption tower to is from about 6.5 to about 7.8, blowing a gas through said aqueous solution of chlorine dioxide in the stripper to strip off from 10 to 100% of the chlorine dioxide entering the stripper and form a gaseous chlorine dioxide product obtained from the stripper with a partial pressure of from 0.5 to 20 kPa, wherein the gaseous chlorine dioxide product has a content of elemental chlorine less than 1 wt %.

\* \* \* \* \*